(12) United States Patent
Abeling et al.

(10) Patent No.: US 8,285,932 B2
(45) Date of Patent: Oct. 9, 2012

(54) MASS STORAGE SYSTEM WITH IMPROVED USAGE OF BUFFER CAPACITY

(75) Inventors: Stefan Abeling, Schwarmstedt (DE); Johann Maas, Langenhagen (DE); Wolfgang Klausberger, Hannover (DE); Thomas Brune, Hannover (DE)

(73) Assignee: Thomson Licensing, Issy les Moulineaux (FR)

( * ) Notice: Subject to any disclaimer, the term of this patent is extended or adjusted under 35 U.S.C. 154(b) by 303 days.

(21) Appl. No.: 12/733,338

(22) PCT Filed: Aug. 26, 2008

(86) PCT No.: PCT/EP2008/061148
§ 371 (c)(1),
(2), (4) Date: Feb. 24, 2010

(87) PCT Pub. No.: WO2009/027398
PCT Pub. Date: Mar. 5, 2009

(65) Prior Publication Data
US 2010/0211738 A1  Aug. 19, 2010

(30) Foreign Application Priority Data
Aug. 31, 2007  (EP) .................................... 07115446

(51) Int. Cl.
*G06F 12/00* (2006.01)
(52) U.S. Cl. ......... 711/114; 711/111; 711/113; 711/165

(58) Field of Classification Search .................. 711/103, 711/111, 113, 114, 138
See application file for complete search history.

(56) References Cited

U.S. PATENT DOCUMENTS

| | | | |
|---|---|---|---|
| 6,430,660 B1 | 8/2002 | Kemp et al. | |
| 7,814,283 B1 * | 10/2010 | Chen et al. | 711/151 |
| 2006/0015682 A1 | 1/2006 | Hiratsuka et al. | |
| 2008/0301376 A1 * | 12/2008 | Allison et al. | 711/141 |
| 2009/0259789 A1 * | 10/2009 | Kato et al. | 710/308 |
| 2010/0228905 A1 * | 9/2010 | Honda | 711/103 |

FOREIGN PATENT DOCUMENTS

| | | |
|---|---|---|
| EP | 1046981 | 10/2000 |
| EP | 1777614 | 4/2007 |

OTHER PUBLICATIONS

Search Report Dated Dec. 3, 2008.

* cited by examiner

*Primary Examiner* — John Lane
(74) *Attorney, Agent, or Firm* — Tutunjian & Bitetto, P.C.

(57) ABSTRACT

The present invention relates to a mass storage system with improved usage of buffer capacity, and more specifically to a mass storage system for real-time data storage with an embedded controller. According to the invention, the mass storage system has a first data path between a real-time data interface and a mass storage array, the first data path including a data buffer without access latency, and a second data path between an embedded processor and the mass storage array, wherein the data buffer without access latency is also used as a data buffer for non real-time data transfers between the embedded processor and the mass storage array.

8 Claims, 1 Drawing Sheet

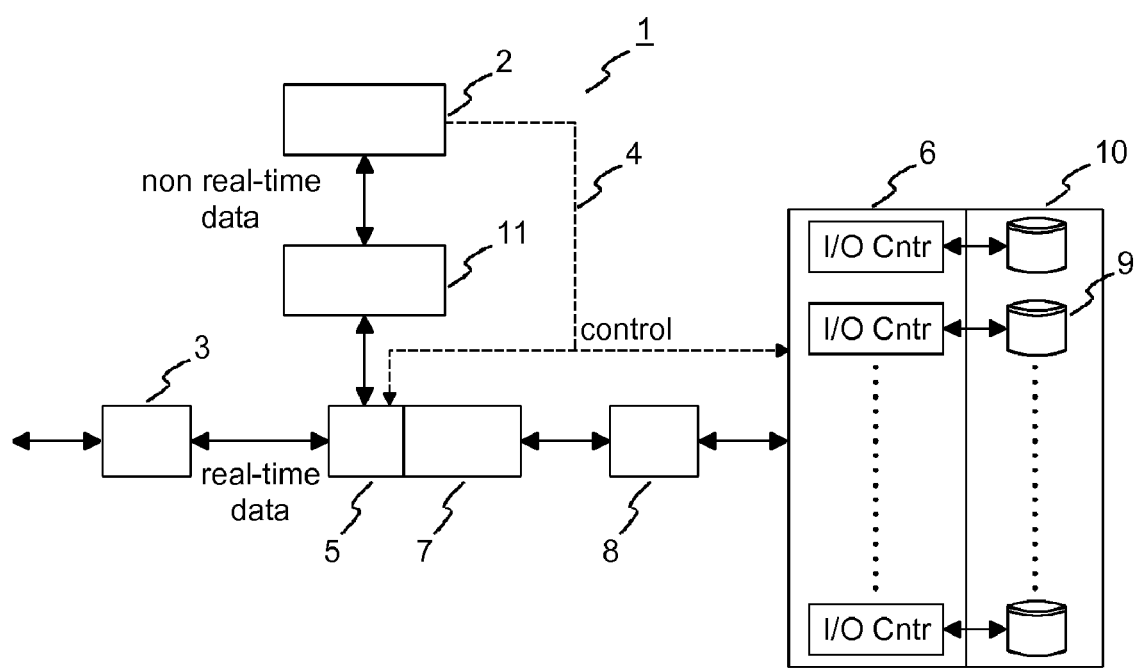

MASS STORAGE SYSTEM WITH IMPROVED USAGE OF BUFFER CAPACITY

CROSS REFERENCE TO RELATED APPLICATIONS

This application claims the benefit, under 35 U.S.C. §365 of
International Application PCT/EP2008/061148, filed Aug. 26, 2008, which was published in accordance with PCT Article 21(2) on Mar. 5, 2009 in English and which claims the benefit of European patent application No. 07115446.2, filed Aug. 31, 2007.

BACKGROUND

1. Field of the Invention

The present invention relates to a mass storage system with improved usage of buffer capacity, and more specifically to a mass storage system for real-time data storage with an embedded controller.

2. Discussion of related art

Embedded stand-alone systems designed for storing real-time data streams with a high data rate coming directly from a data stream source, e.g. a film camera, can generally be split up into two kinds of data processing:

1. Real-time video data storage with a guaranteed data rate, and
2. Non real-time data storage such as file system information managed by an embedded processor.

Both data paths have to be connected to an I/O controller, which implements the I/O communication with storage units forming a mass storage array.

A high guaranteed data rate is reached by parallelization of single storage units such as hard disks, optical disks, or solid state based memories. The above types of storage units often introduce significant latency at the start of a transfer. Since latency is a problem especially when real-time behavior is needed, memory with no or at least no significant access latency such as SRAM and/or SDRAM is introduced. Other requirements, particularly for mobile applications, are that the whole storage system has to be as small as possible and to have a reduced power consumption.

SUMMARY

It is an object of the invention to propose a mass storage system with an improved usage of the available buffer capacity.

According to the invention, this object is achieved by a mass storage system having a first data path between a real-time data interface and a mass storage array, the first data path including a data buffer without access latency, and a second data path between an embedded processor and the mass storage array, wherein the data buffer without access latency is also used as a data buffer for non real-time data transfers between the embedded processor and the mass storage array.

The invention proposes a multi-purpose use of the 'no access latency' memory unit in the real-time data path. This is a more efficient use of the memory and additionally a more efficient way to transfer non real-time data between an embedded processor and a mass storage array consisting of single storage devices. Of course, the invention is not only applicable to systems designed for real-time data. It can likewise be used in other environments where a high guaranteed data rate is needed and latency is a problem.

The 'no access latency' memory, preferably with a small footprint, is integrated into the real-time data path as a real-time data buffer to compensate any latencies of the target mass storage array. The mass storage array consists of two or more single storage units. Each of the storage units is controlled by an I/O controller. Since also the embedded processor has to access and modify data on the mass storage array, there is a second path implemented between the real-time data buffer and the main memory of the processor. Therefore, a data switch is implemented for switching between data from or to the real-time interface and data from or to the embedded processor. Using the necessary real-time data buffer also for non real-time data transfers between the embedded processor and the mass storage array saves an extra buffer for non real-time transfers. Therefore, space and power consumption is reduced.

The hardware blocks are preferably configured by the embedded processor through a control line to be in the required mode. The embedded processor transfers data from and to the mass storage array by initiating a direct memory access transfer (DMA transfer) between its main memory and the real-time data buffer.

This is an efficient implementation because the processor is able to work on other tasks while the data transfer is executed. In addition, access of the embedded processor to the mass storage array via the real-time data buffer is faster than accessing the mass storage array directly.

Advantageously, the mass storage system has a data processing block for splitting up a data stream and sending it in parallel to the two or more storage units. This allows to easily implement RAID or RAID-like systems.

Preferably, one or more thresholds can be set for the 'no access latency' data buffer, the one or more thresholds controlling the instant when data are streamed out of the data buffer to the mass storage array, to the real-time interface, and to the main memory. In this way the performance behavior of the different data targets can be adapted.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures:

FIG. 1 shows an exemplary mass storage system according to the invention.

DETAILED DESCRIPTION

FIG. 1 shows the architectural design of a stand-alone mass storage system 1 with an embedded processor 2 for real-time data streams in form of a block diagram. A real-time interface block 3 is connected to a real-time data source or sink (not shown), i.e. a camera or a display. The embedded processor 2 reacts on user input like 'record video' or 'playback video'. The embedded processor 2 configures the hardware blocks to be in the requested mode through control connections 4 (indicated by the dotted lines). For this purpose, a simple 'mode' register is modified by the embedded processor 2 in a write access, which configures the hardware blocks.

For a real-time data streaming demand the embedded processor 2 first configures the hardware blocks. A data switch 5 selects the real-time interface for data streaming. In addition, a plurality of I/O control units 6 (I/O Ctrl) receive information about the direction (read or write) and the storage address of the real-time data stream. The latter is independent of the direction and the kind of data stream. The main difference between real-time data and non real-time data is the large amount of real-time data that is to be expected in comparison to the usually rather small amount of non real-time data. In order to cope with this difference the number of bytes to be transferred is included in the read/write command to the I/O control units 6. In the real-time mode the I/O control units 6 allow to read/write an amount of data that is sufficiently large to ensure that the embedded processor 2 is able to generate and send the next read/write command. This is necessary to guarantee the real-time data rate, as a relatively large amount of time passes between two read/write commands of the embedded processor 2. In the non real-time mode the amount of data allowed to be read/written with a single read/write command is rather small, as often only a few data have to be transferred.

In case of a 'record' user input the real-time data stream passes the real-time interface 3, the data switch 5, a real-time data buffer 7 and a data processing unit 8, where the real-time data stream is split up and sent in parallel to the I/O control units 6. The I/O control units 6 write the data to a plurality of storage units 9 of a mass storage array 10. As long as the storage units 9 of the mass storage array 10 are not able to receive data, the real-time data stream is stored into the real-time data buffer 7. The data transfer to the mass storage array 10 continues when the storage units 9 are ready to receive data.

For example, such latencies arise if hard disks have to reposition their read/write heads. Due to the mechanical operations a data transfer is paused. Only after finishing the positioning procedure the hard disks are able to run at their media transfer data rate.

In case of a 'playback' user input the data are read in parallel from the storage units 9 and are written into the real-time data buffer 7 after passing the data processing unit 8, where the single data streams are merged into one real-time data stream. The transmission of the real-time data stream through the real-time interface 3 to a data sink is preferably initiated only when the real-time data buffer 7 is full. This measure helps to compensate for latencies produced by the mass storage array 10, and to fulfill the real-time requirements. This behavior is advantageously changeable by setting a threshold, which will be explained later.

If the embedded processor 2 has to access the mass storage array 10, e.g. to update some file system information or to read, write or modify descriptive data belonging to a real-time data stream stored on the mass storage array 10, a non real-time data transfer is executed. The main difference to a real-time data stream is that the real-time interface 3 is logically replaced by the processor's main memory 11. Data are transferred from the main memory 11 to the real-time data buffer 7 in case data are written to the mass storage array 10, or from the real-time data buffer 7 to the main memory 11 in case data are read from the storage array 10. Therefore, a direct memory access (DMA) transfer is initiated by the embedded processor 2 between the main memory 11 and the real-time data buffer 7. The data transfer from the real-time data buffer 7 to the mass storage array 10 is automatically executed. Consequently, after initializing the DMA transfer the embedded processor 2 is free to work on other tasks until a message of a successful or unsuccessful DMA transfer to the mass storage array 10 is received. During a DMA transfer, latencies of the mass storage array 10 are compensated for by the real-time data buffer 7 as if a real-time data stream was processed. This offers a higher performance than direct single word accesses of the embedded processor 2 to the mass storage array 10. A further improvement is that the control mechanism for a non real-time data stream is the same as for a real-time data stream. However, the data switch 6 has to be configured differently to replace the real-time interface 3 with the main memory 11. Also, the amount of data to be written with a single read/write command is modified. The amount of data per command is relatively small, but can likewise be adapted to the needs of the embedded processor 2, so that each DMA transfer is performed with a single command to the I/O control units 6.

A parallelization of the data is executed in the data processing unit 8, allowing to write to, respectively to read from, all single storage units 9 of the mass storage array 10 in parallel. This corresponds to a RAID-0 system. Other RAID or RAID-like systems can be implemented as well.

Thresholds of the real-time data buffer 7 can be dynamically configured by the embedded processor 2, preferably even during two accesses to the mass storage array 10 or when different mass storage units 9 are added to the mass storage array 10. The thresholds control the instant when data are streamed out of the real-time data buffer 7 to the mass storage array 10, to the real-time interface 3, or to the main memory 11. In this way the performance behavior of the different data targets can be adapted. For example, a DMA transfer from the real-time data buffer 7 to the main memory 11 is first initiated when there are at least a number 'n' of bytes available in the real-time data buffer 7, the number 'n' being determined by a special threshold. Consequently, the main memory 11 is locked by the DMA transfer as short as possible and the embedded processor 2 has only to perform its tasks without its main memory 11 for the same short time. The dynamic modification of the thresholds allows to optimally adapt the system to different types of mass storage units 9 or to different types of data accesses, such as data streaming or transmission of smaller data blocks. For example, for some types of solid state disks a pause in the data transfer at an unfavorable instant leads to a drop in the data rate. During recording this is compensated by first collecting data in the real-time data buffer 7 before transferring them to the mass storage units 9. Though this reduces the latencies that can be compensated, the overall data rate is increased.

The invention claimed is:

1. A mass storage system comprising:
    a real-time data interface;
    a mass storage array;
    an SRAM or a DRAM data buffer for real-time data transfers between the real-time data interface and the mass storage array; and
    an embedded processor with a main memory, wherein for a non real-time data transfer from the embedded processor to the mass storage array, the mass storage system being configured to initiate a direct memory access transfer between the main memory of the embedded processor and the SRAM or DRAM data buffer and to execute a data transfer from the SRAM or DRAM data buffer to the mass storage array.

2. The mass storage system according to claim 1, further comprising a data switch for switching between data from or to the real-time data interface and data from or to the main memory of the embedded processor.

3. The mass storage system according to claim 1, wherein the mass storage array comprises two or more storage units.

4. The mass storage system according to claim 3, wherein the two or more storage units are hard disks, optical disks, or solid state memories.

5. The mass storage system according to claim 3, further comprising a data processing block for splitting up a data stream and sending it in parallel to the two or more storage units.

6. The mass storage system according to claim 1, wherein a threshold can be set for the data buffer without access latency, the threshold controlling the instant when data are streamed out of the data buffer to the mass storage array, to the real-time interface, or to the main memory.

7. The mass storage system according to claim 6, wherein different thresholds can be set for data transfers to the mass storage array, to the real-time interface, and to the main memory.

8. A method for data transfer in a mass storage system having a real-time data interface, a mass storage array, an SRAM or a DRAM data buffer for real-time data transfers between the real-time data interface and the mass storage array, and an embedded processor with a main memory; the method comprising the steps of:

initiating a direct memory access transfer between the main memory of the embedded processor and the SRAM or DRAM data buffer; and executing a data transfer from the SRAM or DRAM data buffer to the mass storage array.

\* \* \* \* \*